US006601149B1

United States Patent
Brock et al.

(10) Patent No.: US 6,601,149 B1
(45) Date of Patent: Jul. 29, 2003

(54) MEMORY TRANSACTION MONITORING SYSTEM AND USER INTERFACE

(75) Inventors: Bishop Chapman Brock, Austin, TX (US); Eli Chiprout, Austin, TX (US); Elmootazbellah Nabil Elnozahy, Austin, TX (US); Ramakrishnan Rajamony, Austin, TX (US); Freeman Leigh Rawson, III, Austin, TX (US); Ronald Lynn Rockhold, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,831

(22) Filed: Dec. 14, 1999

(51) Int. Cl.[7] ............................................. G06F 13/00
(52) U.S. Cl. ....................................................... 711/154
(58) Field of Search ............................. 711/5, 147, 154

(56) References Cited

U.S. PATENT DOCUMENTS

| | | | | |
|---|---|---|---|---|
| 5,377,344 A | * | 12/1994 | Stager et al. | 395/425 |
| 6,202,127 B1 | * | 3/2001 | Dean et al. | 711/118 |
| 6,442,585 B1 | * | 8/2002 | Dean et al. | 709/108 |

OTHER PUBLICATIONS

Karl et al., "Optimizing Data Locality for SCI–based PC–Clusters with the SMiLE Monitoring Approach", Oct. 1999, p 1–8, Parallel Architectures and Compilation Techniques.*

* cited by examiner

*Primary Examiner*—Kevin L. Ellis
(74) *Attorney, Agent, or Firm*—Joseph P. Lally; Casimer K. Salys

(57) ABSTRACT

A system for and method of monitoring memory transactions in a data processing system are disclosed. The method includes defining a set of memory transaction attributes with a monitoring system and detecting, on a data processing system connected to the monitoring system, memory transactions that match the defined set of memory transaction attributes. The number of detected memory transactions occurring during a specified duration are then displayed in a graphical format. In one embodiment, the data processing system comprises a non-uniform memory architecture (NUMA) system comprising a set of nodes. In this embodiment, the detected transactions comprise transactions passing through a switch connecting the nodes of the NUMA system. The set of memory transaction attributes may include memory transaction type information, node information, and transaction direction information. The data processing system may operate under a first operating system such as a Unix® based system while the monitoring system operates under a second operating system such as a Windows® operating system. The set of memory transactions may include memory address information. In this embodiment, defining the memory address information may include defining a memory window size, subdividing the memory window into a set of memory grains, and displaying the number of detected memory transactions corresponding to each memory grain in the memory window.

21 Claims, 7 Drawing Sheets

MEMORY TRANSACTION MONITORING SYSTEM AND USER INTERFACE

RELATED APPLICATIONS

The subject matter disclosed herein is related to the subject matter disclosed in pending U.S. patent applications entitled Performance Monitoring in a NUMA Computer (Ser. No. 09/282,626, filed Mar. 31, 1999) and Efficient Identification of Candidate Pages and Dynamic Response in a NUMA Computer (Ser. No. 09/282,625, filed Mar. 31, 1999) which share a common assignee with the present application and are incorporated herein by reference.

BACKGROUND

1. Field of the Present Invention

The present invention generally relates to the field of data processing systems and more particularly to an application for monitoring and graphically displaying memory transactions in a distributed memory system.

2. History of Related Art

The use of multiple processors to improve the performance of a computer system is well known. In a typical multi-processor arrangement, a plurality of processors are coupled to a system memory via a common bus referred to herein as the system or local bus. The use of a single bus ultimately limits the ability to improve performance by adding additional processors because, after a certain point, the limiting factor in the performance of a multiprocessor system is the bandwidth of the system bus. Generally speaking, the system bus bandwidth is typically saturated after a relatively small number of processors have been attached to the bus. Incorporating additional processors beyond this number generally results in little if any performance improvement.

Distributed memory systems have been proposed and implemented to combat the bandwidth limitations of single bus systems. In a distributed memory system, two or more single bus systems referred to as nodes are connected to form a larger system. Each node typically includes its own local memory. One example of a distributed memory system is referred to as a non-uniform memory architecture (NUMA) system. A NUMA system is comprised of multiple nodes, each of which may include its own processors, local memory, and corresponding system bus. The memory of each node is accessible to each other node via a high speed interconnect network that links the various nodes. The use of multiple system busses (one for each node) enables NUMA systems to employ additional processors without incurring the system bus bandwidth limitation experienced by single bus systems. Thus, NUMA systems are more suitably adapted for scaling than conventional systems.

In a NUMA system, the time required to access system memory is a function of the memory address because accessing memory local to a node is faster than accessing memory residing on a remote node. In contrast, access time is essentially independent of the memory address in conventional SMP designs. Software optimized for use on conventional machines may perform inefficiently on a NUMA system if the software generates a large percentage of remote memory accesses when executed on the NUMA system. The potential for performance improvement offered by scaleable NUMA systems may be partially offset or entirely negated if, for example, the paging scheme employed by the NUMA system allocates a code segment of the software to the physical memory of one node and a data segment that is frequently accessed by the processors of another node. Due to variations in memory architecture implementation, paging mechanisms, caching policies, program behavior, etc., tuning or optimizing of any given NUMA system is most efficiently achieved with empirically gathered memory transaction data. Accordingly, mechanisms designed to monitor memory transactions in NUMA systems are of considerable interest to the designers and manufacturers of such systems. Hardware mechanisms suitable for gathering memory transaction information in a NUMA system have are disclosed in the above referenced patent applications. To take full advantage of the information the monitoring hardware is capable of gathering, it is desirable to implement an elegant and powerful user interface that enables the user to capture, display, and analyze information provided by memory transaction monitoring hardware.

SUMMARY OF THE INVENTION

The problem identified above is addressed by a system for and method of monitoring memory transactions in a data processing system. The method includes defining a set of memory transaction attributes with a monitoring system and detecting, on a data processing system connected to the monitoring system, memory transactions that match the defined set of memory transaction attributes. The number of detected memory transactions occurring during a specified duration are then displayed in a graphical format. In one embodiment, the data processing system comprises a non-uniform memory architecture (NUMA) system comprising a set of nodes. In this embodiment, the detected transactions comprise transactions passing through a switch connecting the nodes of the NUMA system. The set of memory transaction attributes may include memory transaction type information, node information, and transaction direction information. The data processing system may operate under a first operating system such as a Unix® based system while the monitoring system operates under a second operating system such as a Windows® operating system. The set of memory transactions may include memory address information. In this embodiment, defining the memory address information may include defining a memory window size, subdividing the memory window into a set of memory grains, and displaying the number of detected memory transactions corresponding to each memory grain in the memory window.

The invention further contemplates a system for monitoring memory transactions on a data processing system such as a NUMA system. The system includes a processor, a device driver configured to receive memory transaction information from a switch connecting the nodes of the NUMA system, and user code configured to enable a user to define a set of memory transaction attributes. The user code is further suitable for displaying the number of memory transactions matching the defined set of memory attributes during a specified duration. The device driver and user code may execute under a first operating system while the NUMA system is operating under a second operating system. The set of memory transaction attributes may include memory transaction type information, memory transaction direction information, and memory transaction node information. The set of memory transaction attributes may include memory address information.

BRIEF DESCRIPTION OF THE DRAWINGS

Other objects and advantages of the invention will become apparent upon reading the following detailed description and upon reference to the accompanying drawings in which.

Figure 1:
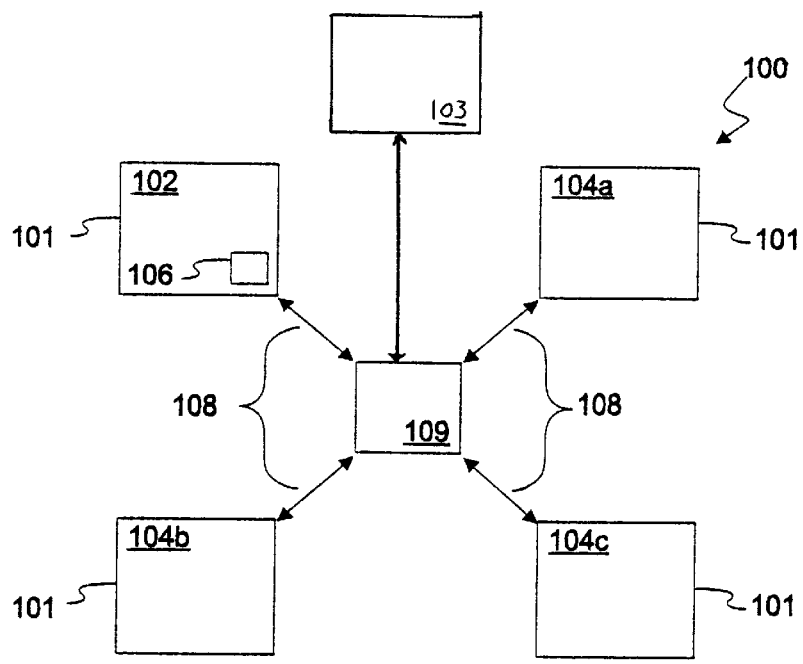
FIG. 1 is a diagram of a computer system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a computer system 100 according to one embodiment of the present invention. The depicted embodiment of computer system 100 is comprised of a plurality of nodes 101 designated for purposes of facilitating the discussion herein as local node 102 and one or more remote nodes 104a, 104b, . . . 104n (collectively referred to as remote nodes 104). In one embodiment of computer system 100, each node 101 is essentially equivalent to the remaining nodes and the identification of one node as a local node is intended merely to provide a frame of reference with respect to certain transactions and components. Local node 102 and remote nodes 104 are coupled to one another via an interconnect network 108 through a switch 109. The embodiment depicted includes a total of four nodes 101 where each node is coupled to all other nodes through switch 109, but those skilled in the design of distributed memory computer systems will readily appreciate that additional nodes may be added to (or removed from) system 100 and that the nodes may be interconnected with any of a variety of interconnect mesh topologies. The preferred embodiment of computer system 100 contemplates a non-uniform memory architecture (NUMA) in which each node 101 of the system includes a local memory 128 (depicted in FIG. 2) to which the node has relatively inexpensive or fast access (referred to herein as a local access). In addition, each node 101 is capable of accessing the local memories of the other nodes via interconnect 108 and switch 109 with an access (referred to herein as a remote access) that is slower than a local access. In contrast to a NUMA computer system, a symmetrical multi-processing (SMP) system as used herein describes an architecture in which each of a plurality of system processors has essentially equally fast access to the system's memory.

One component of optimizing program performance on a NUMA computer system is concerned with minimizing the number of remote accesses that a program initiates during execution. (For purposes of this disclosure, the word program encompasses a wide variety of software including operating systems and applications). The difficulty in achieving this goal in a portable manner is substantial because the memory layout is usually program and machine dependent, complex in nature, and available only to a limited number of programs in the system. Accordingly, it is preferable to gather accurate information concerning the performance of a program executing on any given NUMA system empirically. To assist in this task, performance monitor 106 of local node 102 of computer system 100 counts and categorizes remote accesses by monitoring transactions that traverse interconnect network 108. Although not depicted, each node 101 includes its own performance monitor 106 in the preferred embodiment of system 100. In one embodiment, performance monitor 106 is configurable to count either incoming transactions (accesses to the local memory of local node 102 originating from remote nodes 104) or outgoing transactions (accesses to the local memories of remote nodes 104 originating from local node 102).

Figure 2:
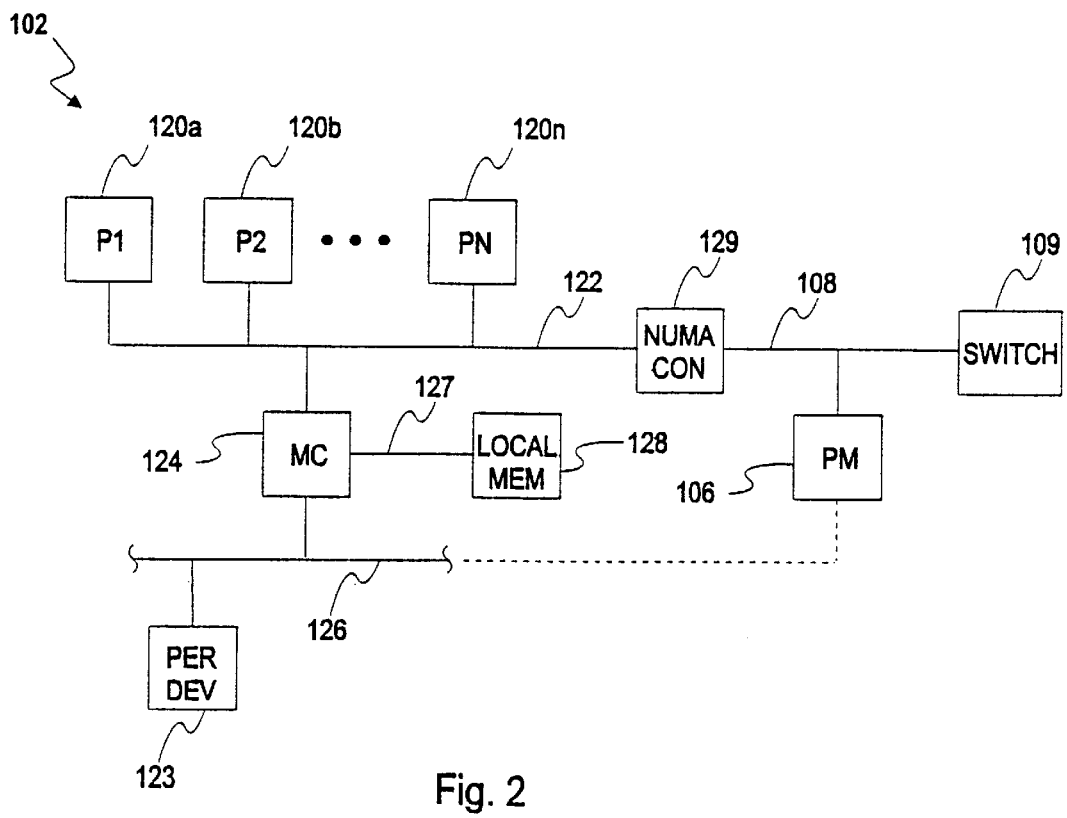
FIG. 2 is a simplified block diagram of a node of the computer system of FIG. 1.

Before discussing performance monitor 106 in further detail, a general description of local node 102 is presented in conjunction with FIG. 2, which depicts one embodiment of local node 102 in simplified block diagram fashion. Local node 102 as depicted in FIG. 2 includes one or more processors 120 that communicate with each other and with other components of local node 102 via a system or local bus 122. Each processor 120 may include one or more levels of cache memory (not depicted) for storing relatively small portions of data and instructions in a relatively fast memory such as an array of static random access memory (SRAM) devices. Processors 120 are coupled to a local memory 128 and to an I/O bus 126 through a memory controller (MC) 124. Local memory 128, which is coupled to MC 124 via a memory bus 127, is suitably comprised of an array of dynamic random access memory (DRAM) devices. I/O bus 126 is typically implemented with any of a variety of standardized bus architectures including, for example, Revision 2.2 of the PCI Local Bus Standard published by the PCI Special Interest Group (www.pcisig.com) and incorporated by reference herein. The PCI bus is designed to provide a high throughput I/O facility for local node 102. A peripheral device 123 is depicted as coupled to I/O bus 126. In an embodiment in which I/O bus 126 comprises a PCI bus, peripheral device 123 may comprise a graphics adapter, video controller, hard disk controller, high speed network adapter, or other suitable device. The widespread prevalence of the PCI bus as a vehicle for communicating with processors is utilized in one embodiment of the present invention in which I/O bus 126 is a PCI bus and communications to and from PM 106 are accomplished via I/O bus 126. This embodiment of local node 102 is indicated by the dashed line extending from I/O bus 126 to PM 106. Other examples of bus standards with which I/O bus 126 may comply include the ISA, EISA, and MCA standards. In addition, local node 102 may further include a second bus bridge (not depicted) attached to I/O bus 126 to provide facilities for a second I/O bus architecture within local node 102. In one embodiment, for example I/O bus 126 is a PCI bus to which a PCI/ISA bus bridge is attached to provide facilities for receiving ISA compliant devices such as keyboards, pointing devices (mice), and the like. Local node 102 further includes a NUMA controller 129 connected between interconnect 108 or computer system 100 and system bus 122. In the depicted embodiment, performance monitor 106 is connected to interconnect network 108. In other embodiments, not depicted, performance monitor 106 may connect directly to system bus 122. This embodiment would have the advantage of being able to monitor local transactions as well as remote transactions.

Figure 3:
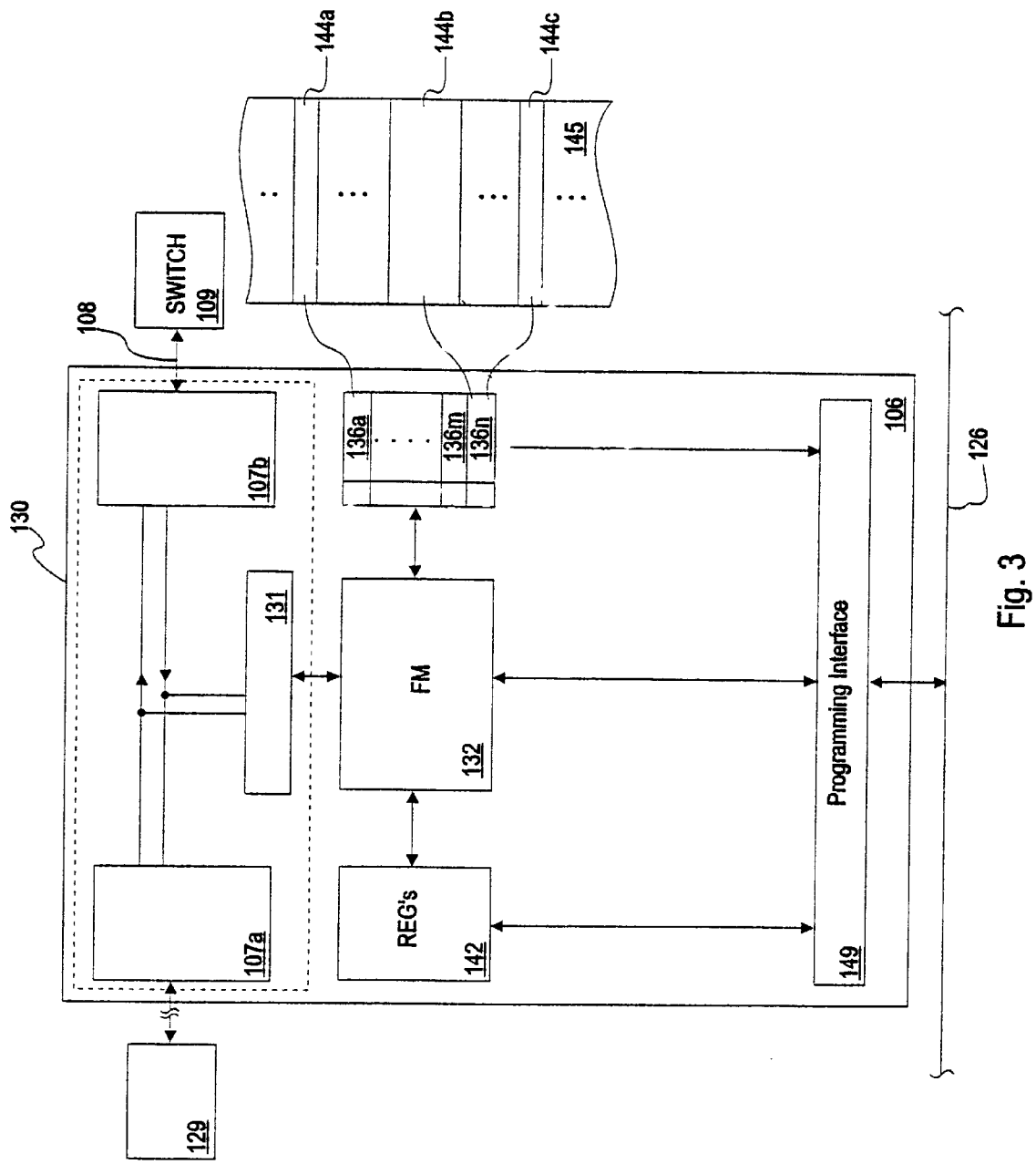
FIG. 3 is a simplified block diagram of a performance monitor according to the present invention.

Turning now to FIG. 3, an embodiment of performance monitor 106 suitable for separately monitoring two or more concurrently running programs is presented. In the depicted embodiment, performance monitor 106 includes an interface unit 130 that monitors interconnect network 108 of computer system 100. Interface unit 130 is configured to detect remote memory transactions as they traverse interconnect network 108 between local node 102 and any of the remote nodes 104. In the preferred embodiment of computer system 100, interconnect network 108 bandwidth is preserved and system performance is improved when programs are constructed to minimize network transactions (i.e., memory transactions initiated by one node that cannot complete without retrieving data from another node). It should be noted that network transactions result not only from remote accesses, in which a processor on one node executes a load/store to the local memory of another node, but also when the cache coherency policies of system 100 require an inter-node data transfer to complete a local transaction. Gathering data about network transactions is a critical step in tuning or optimizing application and operating system software for use on the NUMA system under consideration. It will be appreciated that the depicted embodiment of performance monitor 106 is associated with local node 102 and monitors only those remote transactions that either originate or terminate at local node 102. If, for example, remote node 104a issues a transaction requiring a memory access to the local memory of remote node 104b, this transaction would not be monitored by performance monitor 106 as implemented in the depicted embodiment even though the transaction comprises a remote access. To adequately monitor all remote accesses that occur, one embodiment of computer system 100 contemplates that each remote node 104 includes its own performance monitor. With each node 101 of computer system 100 equipped with a performance monitor such as performance monitor 106 of local node 102, system wide performance monitoring is facilitated.

In one embodiment desirable for its flexibility during a design phase of performance monitor 106, portions of interface unit 130 and other components of performance monitor 106 are implemented with commercially distributed programmable gate arrays. In embodiments in which the design of performance monitor 106 has been substantially completed and changes to the layout are not expected, performance monitor 106 may be fabricated as an application specific integrated circuit (ASIC) using a dedicated mask set. In either case, portions of interface unit 130 and other components of performance monitor 106 are preferably designed to operate with a 3.3V power supply using low voltage TTL logic levels. Interconnect network 108 of computer system 100, on the other hand, might suitably be designed with a high speed architecture that uses low-swing pseudo-differential signals in which signal levels above a specified threshold are interpreted as a logic high and signal levels below the threshold as a logic low to achieve high signaling speeds on interconnect network 108 by minimizing delays associated with signal rise and fall times. The discrepancy between the signal levels that drive the logic of performance monitor 106 and the interconnect network 108 is accommodated within interface unit 130 by the presence of signal processing devices 107a and 107b, which are configured to provide a TTL compatible representation of memory transactions traversing network 108. In one embodiment, interface unit 130 further includes an extraction unit 131 configured to extract pertinent information from memory transactions detected on interconnect network 108. This pertinent information preferably includes physical address information and may further include additional information such as transaction type information and node identification information. Transactions present on interconnect network 108 may include data and control information that is not needed to accomplish the essential task of gathering information about which memory addresses are responsible for the remote accesses that take place on computer system 100. To significantly reduce the amount of circuitry required to implement the preferred embodiment of performance monitor 106, only essential information is extracted from memory transactions on interconnect network 108 and forwarded to filter module 132. In one exemplary embodiment, memory transactions on interconnect network 108 include 128 bits of information while the essential information extracted from the transaction includes just 41 bits including, for example, a physical address field, a transaction type field, and a node ID field. As implied by their names, the transaction type field indicates the type of a transaction (e.g., read transaction, write transaction, read-with-intent-to-modify transaction, etc.) while the node id field indicates the other node associated with the transaction.

Figure 4:
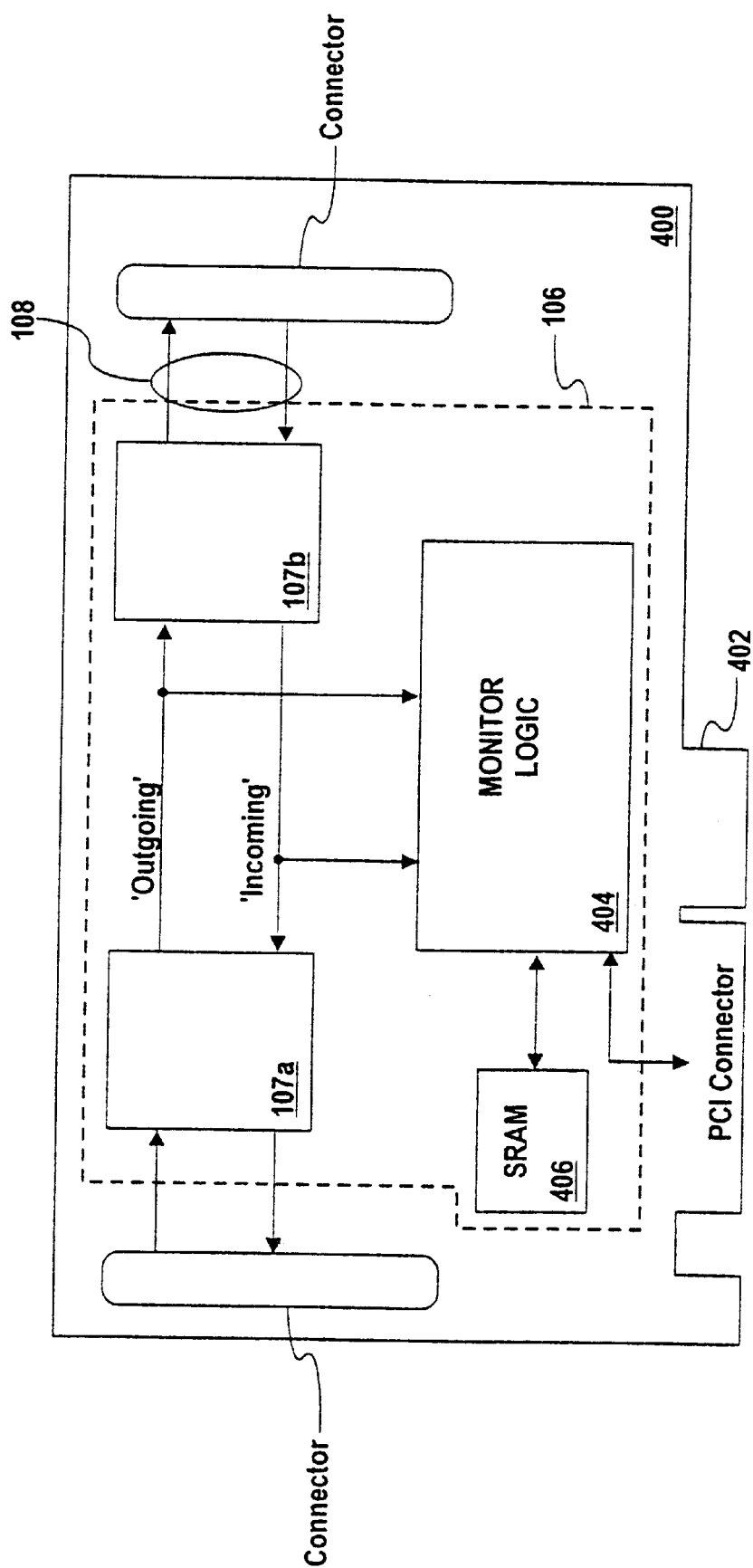
FIG. 4 is a top plan view of a circuit board embodiment of the performance monitor of FIG. 3 for use in the computer system of FIG. 1.

The information extracted from memory transactions by extraction unit 131 is forwarded to filter module 132. Upon receiving this extracted information from interface unit 130, filter module 132 associates the physical address of the detected transaction with one of a plurality of memory blocks 144. Each memory block 144 corresponds to a contiguous portion of the physical address space 145 of computer system 100 that is being monitored. Physical address space 145 encompasses the entire memory of computer system 100 in addition to the system's I/O space. To provide maximum flexibility in the ability to monitor selected portions of physical address space 145, the boundaries that define each of the memory blocks 144 are programmably set prior to monitoring via programming interface 149. In one embodiment, programming interface 149 provides an interface between programmable portions of performance monitor 106 and I/O bus 126 of local node 102. (In another embodiment, not depicted, suitable for monitoring additional memory transaction information such as, for example, processor ID information, performance monitor 106 is coupled to system bus 122 and communication with programmable portions of monitor 106 is accomplished via system bus 122). In embodiments of local node 102 in which I/O bus 126 is a PCI bus, utilizing I/O bus 126 as the communication channel between computer system 100 and performance monitor 106 can ease the design of performance monitor 106 and programming interface 149 by taking advantage of a widely used and well documented bus protocol. Turning briefly to FIG. 4, an embodiment of performance monitor 106 is shown as implemented on a printed circuit board 400 suitable for coupling to I/O bus 126 of local node 102 via PCI connector 402. In this depiction, performance monitor 106 includes monitor logic 404 comprised of one or more field programmable gate arrays or application specific devices, a static memory device 406 used to store block counters 136 as discussed below, and the signal processing devices 107a and 107b discussed previously.

Returning now to FIG. 3, filter module 132, based upon programmed settings defining boundaries for memory blocks 144, associates the physical address extracted by extraction unit 131 with at least one of the memory blocks 144. In the depicted embodiment, each memory block 144 corresponds to a memory block counter 136. Filter module 132 increments the memory block counter 136 of each memory block 144 with which the physical address is associated. Implementing the mechanism by which the boundaries of memory blocks 144 are defined in performance monitor 106 involves a tradeoff between flexibility and feasibility. In an embodiment emphasizing flexibility, upper and lower addresses or, alternatively, a base address and a range could be defined for each memory block 144 and stored in dedicated registers. While this implementation offers the advantage of randomly defined address boundaries for each memory block 144 without regard to the address boundaries of the remaining blocks 144, it will be appreciated that, if a significant number of memory blocks are to be monitored, the number of dedicated registers necessary to implement such a scheme would quickly consume a considerable portion of the performance module resources and cost. In an implementation designed to emphasize feasibility and to reduce the number of dedicated registers required to define memory blocks 144, the block size of each memory block 144 could be fixed. In this manner complete definition of each block would require only a base address. Although this design saves resources over the previously discussed implementation, it introduces constraints imposed by fixed block sizes without totally eliminating the problem of requiring additional dedicated resources for each defined memory block 144. A suitable implementation designed to provide sufficient flexibility to define a very large number of memory blocks while simultaneously addressing the problem of scarce resources is achieved with an embodiment of the present invention in which physical address space 145 is first divided, through software programming, into a relatively few number of randomly defined memory regions. The memory regions are then further divided into a selectable number of memory blocks 144 where each block in a given region has a fixed size, but where the block size of memory blocks 144 in different regions may differ.

Turning back to FIG. 1, the depicted embodiment of system 100 includes a monitoring system 103 connected to switch 109. In this embodiment, monitoring system 103 is preferably configured to monitor inter-node transactions passing through switch 109. In the preferred embodiment, monitoring system 103 is configured to present the user with graphical representations of transactions monitored on switch 109. In addition, monitoring system 103 provides the user with selectable inputs that permit the user to visualize various types of transactions and to determine the regions in physical memory corresponding to the monitored transactions. With the graphical interface provided by monitoring system 103, a user can gather empirical memory access information to discover any memory performance inefficiencies or abnormalities that may exist within system 100. Although the depicted embodiment of system 100 indicates monitoring system 103 as separate from local node 102 and remote node 104, another embodiment of the invention may incorporate the performance monitoring and graphical user interface facilities of performance monitoring system 103 into local node 102 or one of the remote nodes 104.

Figure 5:
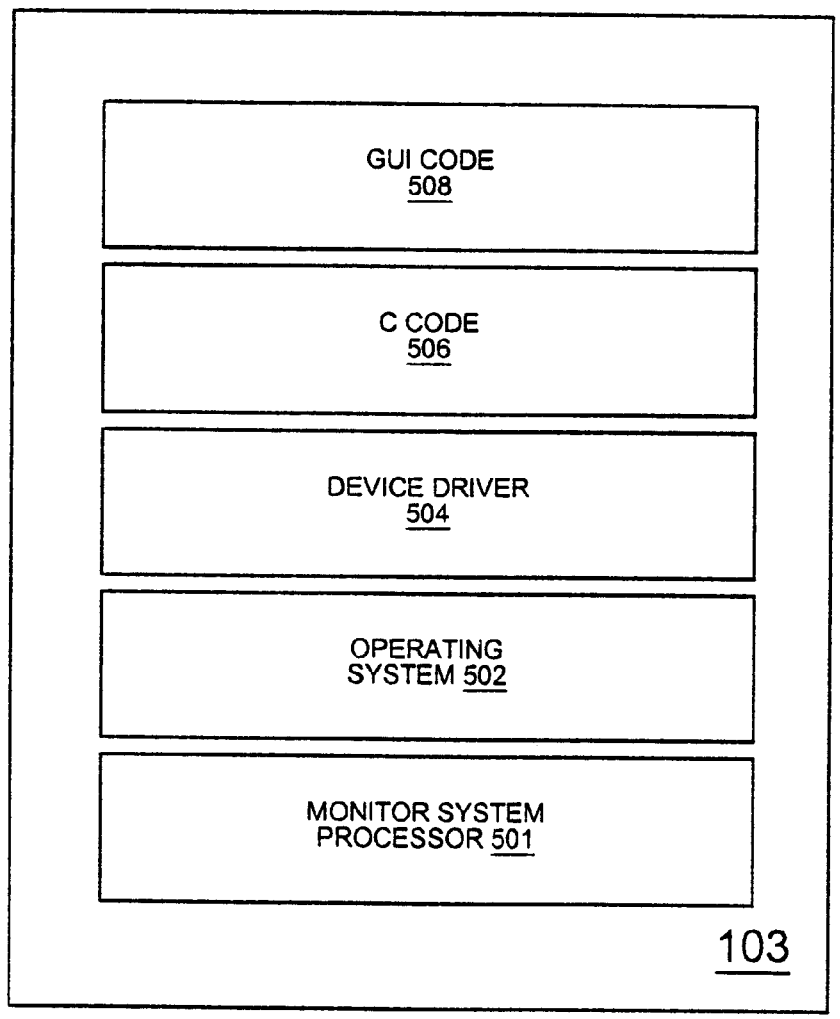
FIG. 5 is a block diagram of selected components of a monitoring system according to one embodiment of the present invention.

Turning now to FIG. 5, a block diagram of one embodiment of monitoring system 103 is presented. The method and system of the present invention may be implemented as computer program product comprising a set of computer instructions executable by a microprocessor-based data processing system. In this embodiment, the set of computer instructions are contained within a suitable storage facility such as, for example, a system memory of monitoring system 103, a hard disk, a floppy disk, a CD ROM, a magnetic tape, or other suitable storage facility. The major functional blocks of the set of computer instructions (software) comprising monitoring system 103 are depicted in FIG. 5. According to the depicted embodiment, monitoring system 103 includes a processor or set of processors 501 suitable for executing the software on system 103. Monitoring system 103 further includes an operating system 502, a device driver 504, a software block referred to as C code 506, and graphical user interface (GUI) code 508. In one embodiment, the operating system 502 may comprise a UnixWare 7 operating system from Santa Cruz Operation, Inc. In other embodiments, operating system 502 may comprise other Unix based operating systems such as the Linux operating system. Device driver 504 includes code that interacts with performance monitor 106 enabling the user to program the interrupts that the programmer desires to receive from performance monitor 106. In addition, device driver code 504 is suitable for manipulating the PCI bus 126 to program performance monitor 106. C code 506 provides a facility to exercise a set of libraries provided by device driver code 504 to extract information from performance monitor 106. GUI code 508 is preferably a high level, platform independent code segment that is suitable for generating a graphical user interface to present the information extracted by C code 506 in a readable and informative format.

Preferably, C code 506 and GUI code 508 (collectively referred to as the user code) are suitable for determining and displaying various characteristics of the packet traffic through switch 109. In one embodiment, for example, the user code is suitable for displaying the number of packets detected by switch 109 that have certain defined memory transaction attributes. In one embodiment, the defined memory transaction attributes may include packet direction, node information, packet type criteria, and memory address information. Preferably, the user code is suitable for determining a packet type for each packet as well as a destination and source node for each packet. The user code is preferably configured to count and sort the packets according to their source node, destination node, or packet type. In one embodiment, the user code monitors eight counters on each performance monitor 106. For each of the eight counters, the user code permits the user to define the node to be monitored, the packet direction to be monitored (i.e., incoming packets or outgoing packets) and the packet type to be monitored. The packets traversing interconnect network 108 preferably include packet type information that identifies the packet as belonging to one of a predefined number of packet types. Suitable packet types may includes data packet types, write back packet types, copy back packet types, invalidate packet types, and so forth. For each of the counters, the user code allows the user to select one or all of the packet types for monitoring. Similarly, the user code enables the user to select for each counter, the node of interest (or all nodes) and the packet direction of interest (incoming packets or outgoing packets).

Figure 6:
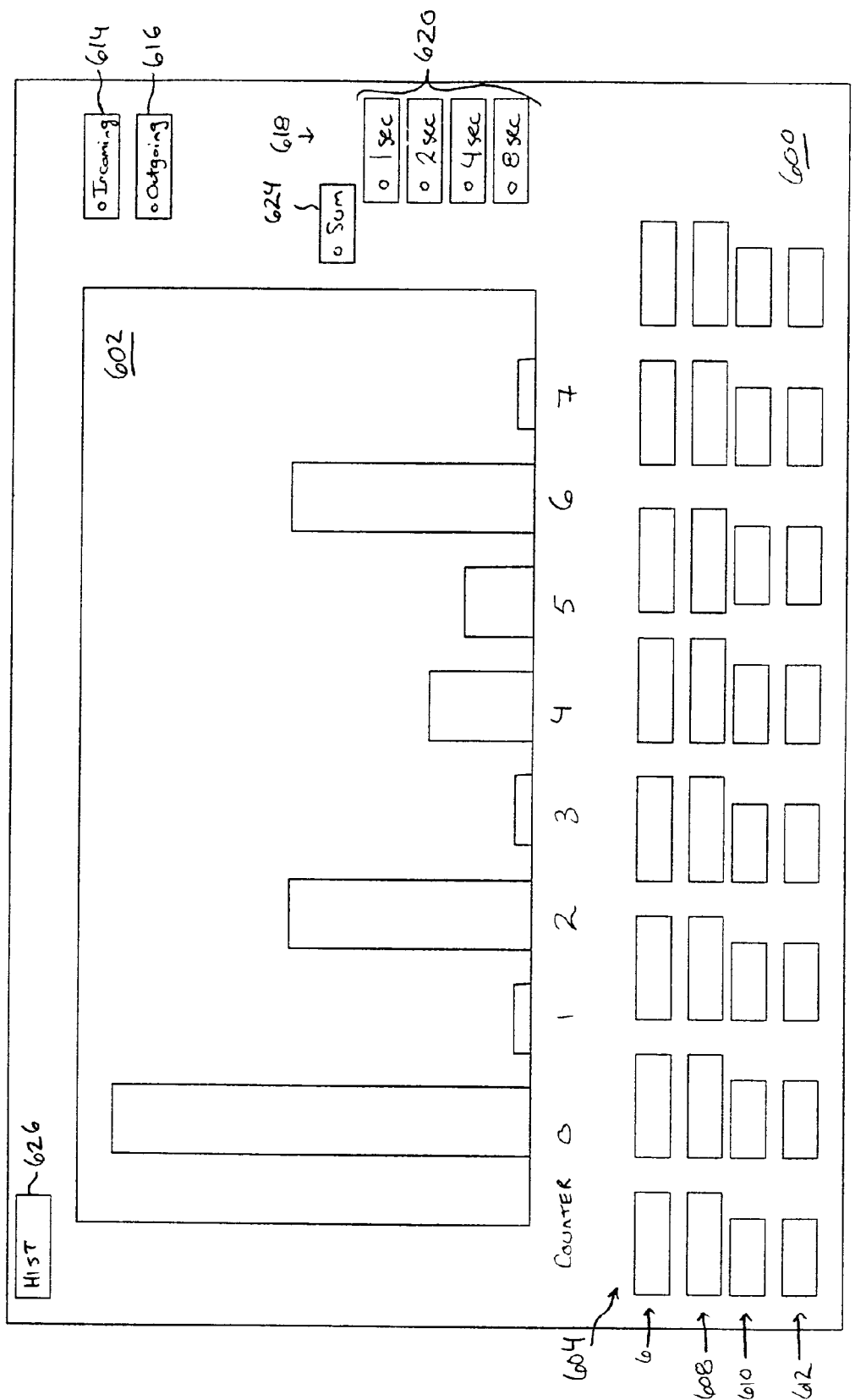
FIG. 6 illustrates an graphical user interface suitable for use with the monitoring system of FIG. 5.

Turning now to FIG. 6, a graphical user interface 600 produced by the user code according to one embodiment of the invention is depicted. Interface 600 includes a bar chart section 602 that displays the packets counted by each of the eight counters (Counter 0 through Counter 7). In the depicted embodiment, the Counter 0 bar chart is normalized against the remaining bar charts (Counters 1 through 7). In other words, each of the Counter 1 through 7 bar charts indicates a percentage relative to the Counter 0 bar chart. In this embodiment, the Counter 0 bar chart is referred to as the reference bar chart. In the preferred embodiment, the bar chart that serves as the reference bar chart is selectable by the user. Graphical user interface 600 according to the embodiment depicted in FIG. 6 further includes a data section 604 that indicates information concerning each of the eight counters. For each counter, data section 604 includes a count field 606, a percentage field 608, a node field 610, and a packet type field 612. The count field 606 displays the number of packets counted by the corresponding counter, while the percentage field 608 indicates the number of packets as a percentage of the packets counted by the reference counter. The node field 610 indicates the node (or all nodes) whose packets are being counted and the type field 612 indicates the type of packets that are being counted. In the preferred embodiment, each of the node fields 610 and the type field 612 contains a user selectable value enabling the user to monitor any or all of the nodes of system 100 and any or all of the defined packet types.

As indicated previously, one embodiment of the user code enables the user to define whether incoming or outgoing packets are to be monitored. To enable this feature, graphical user interface 600 includes direction buttons 614 and 616. In addition, one embodiment of the user code permits the user to define timing intervals over which the monitored information is to be gathered and displayed. Thus, the depicted embodiment of graphical user interface 600 includes a timing section 618 that includes a set 620 of interval settings and a summation button 624. When the summation button 624 is selected, the counters are placed in an accumulate mode in which the count values of each of the counters continually increases (or stays the same if no appropriate packets are encountered). When the summation button 624 is disabled, the counters are cleared periodically (based on the selected interval button) such that the histograms depict "instantaneous" data that may change relatively rapidly whereas the summation mode provides a more stable view of the memory performance over a longer period of time.

Figure 7:
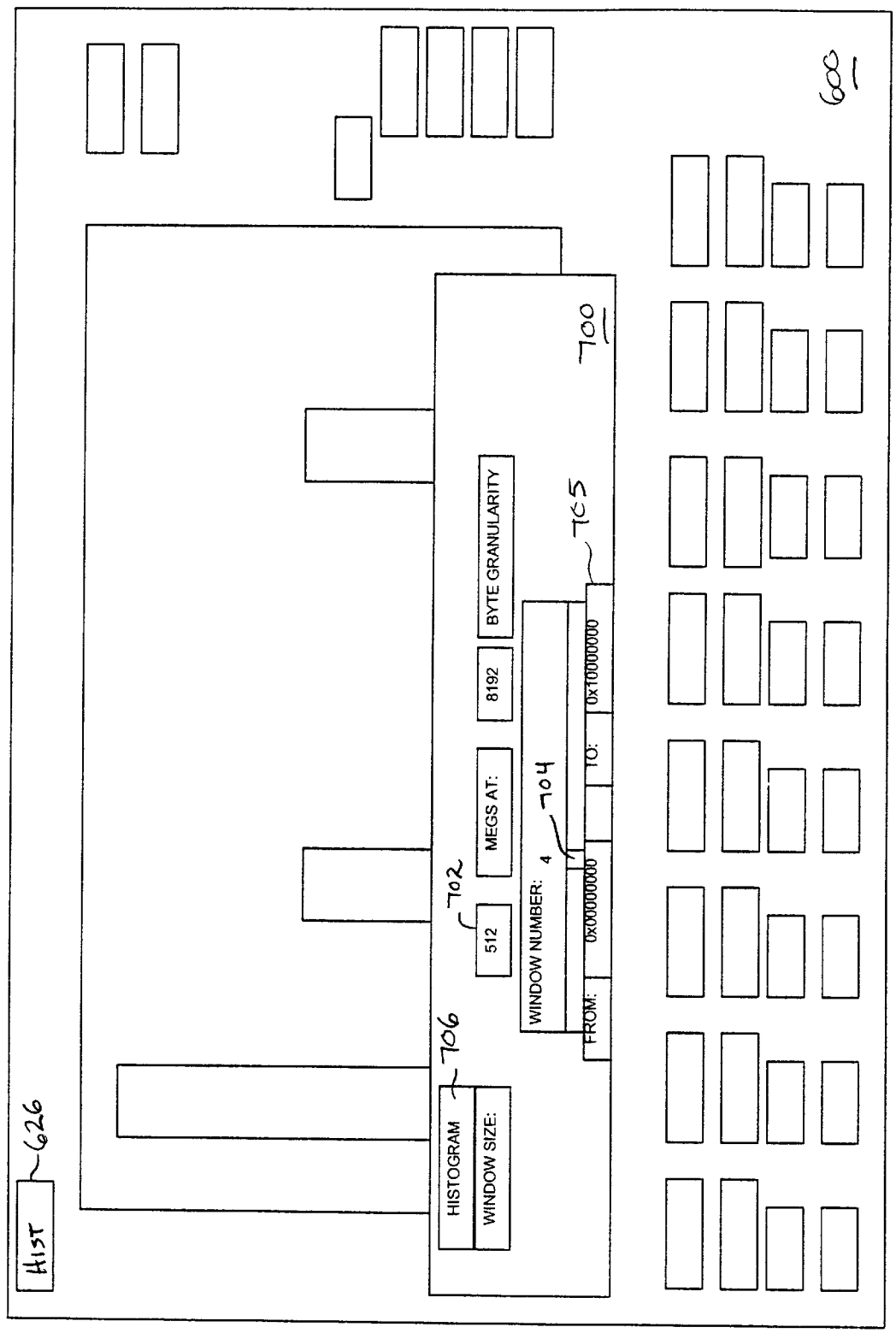
FIG. 7 illustrates a graphical user interface suitable for use with the monitoring system of FIG. 6.

In addition to enabling a user to inspect the types of packets that system 100 is generating and the nodes responsible for the various packets, the user code is preferably adapted to permit the user to discover information about the memory addresses associated with each packet. Obtaining memory address information (address information) is crucial to a memory performance study of a NUMA system because of the dependence between memory access time and memory address in such systems. To facilitate the analysis of address information, the user code according to the present invention, is adapted to enable the user to visualize the locations in physical memory that are generating the most inter-node activity. One embodiment of the invention accomplishes this visualization by providing facilities permitting the user to generate a histogram of physical memory location activity. Turning to FIG. 7, one embodiment of interface 600 includes a histogram button 626 that, when clicked, presents the user with a histogram interface 700. Preferably, histogram interface 700 enables the user to select a granularity for the memory activity histogram. In the depicted embodiment, the granularity selection is achieved by specifying a memory window size in a memory window size box 702 from a specified list of available memory window sizes. In an embodiment where, for example, system 100 comprises four nodes 101, each node with 1 GB of physical memory, the total physical memory size of system 100 is 4 GB. In such an embodiment, the available memory window sizes might include window sizes of 4 GB, 2 GB, 1 GB, 512 MB, 256 MB, 128 MB, 64 MB, 32 MB, and so forth. Preferably, the available window sizes range from a very large window size (i.e., a window size equal to the size of the physical memory space) suitable for obtaining a general overview of memory activity down to a relatively small window size in which, for example, the activity occurring on a single cache line is depicted. In one embodiment, the available window sizes may range down to a smallest window size of 2 MB. In the depicted embodiment of histogram interface 700, the memory window size selected in memory window size box 702 defines a corresponding granularity. The granularity is a function of the window sizes and the number of memory windows that monitoring system 103 supports. In the example depicted in FIG. 7 for example, the selection of a 512 MB ($2^{29}$ Byte) memory window size results in a byte granularity of 8K ($2^{13}$) thereby implying that monitoring system 103 is capable of tracking up to 64K ($2^{16}$) memory windows. With this "resolution," the system is capable of monitoring a granularity of just 32 bytes for a window size of 2 MB.

In addition to defining the granularity of the memory activity histogram, the selection of a memory window size defines the number of memory windows. Preferably, the number of memory windows is simply the size of the total memory divided by the size of the memory window. In the example depicted in FIG. 7, the selection of a 512 MB window size on a 4 GB system results in eight memory windows for which histograms are viewable. Users select which of the memory windows they want to view with a slide bar 704. The slide bar 704 preferably adjusts automatically the number of available windows based on the memory window size and the total memory size. Thus, when the memory window size results in eight memory windows, slide bar 704 allows a user to select from window 0 to window 7. If the memory window size was halved, the number of windows would double to 16 and slide bar 704 would adjust automatically to enable a user to select any of the 16 windows. In addition, the preferred embodiment of histogram interface 700 displays the range of physical addresses corresponding to the currently selected memory window in a display box 705. As depicted in the example, window number (in a system where window numbering starts at 1) is selected in a system with a 512 MB window size and a 4 GB total memory size the range of physical addresses that will be profiled is indicated as 0x60000000 to 0x7FFFFFFF.

Figure 8:
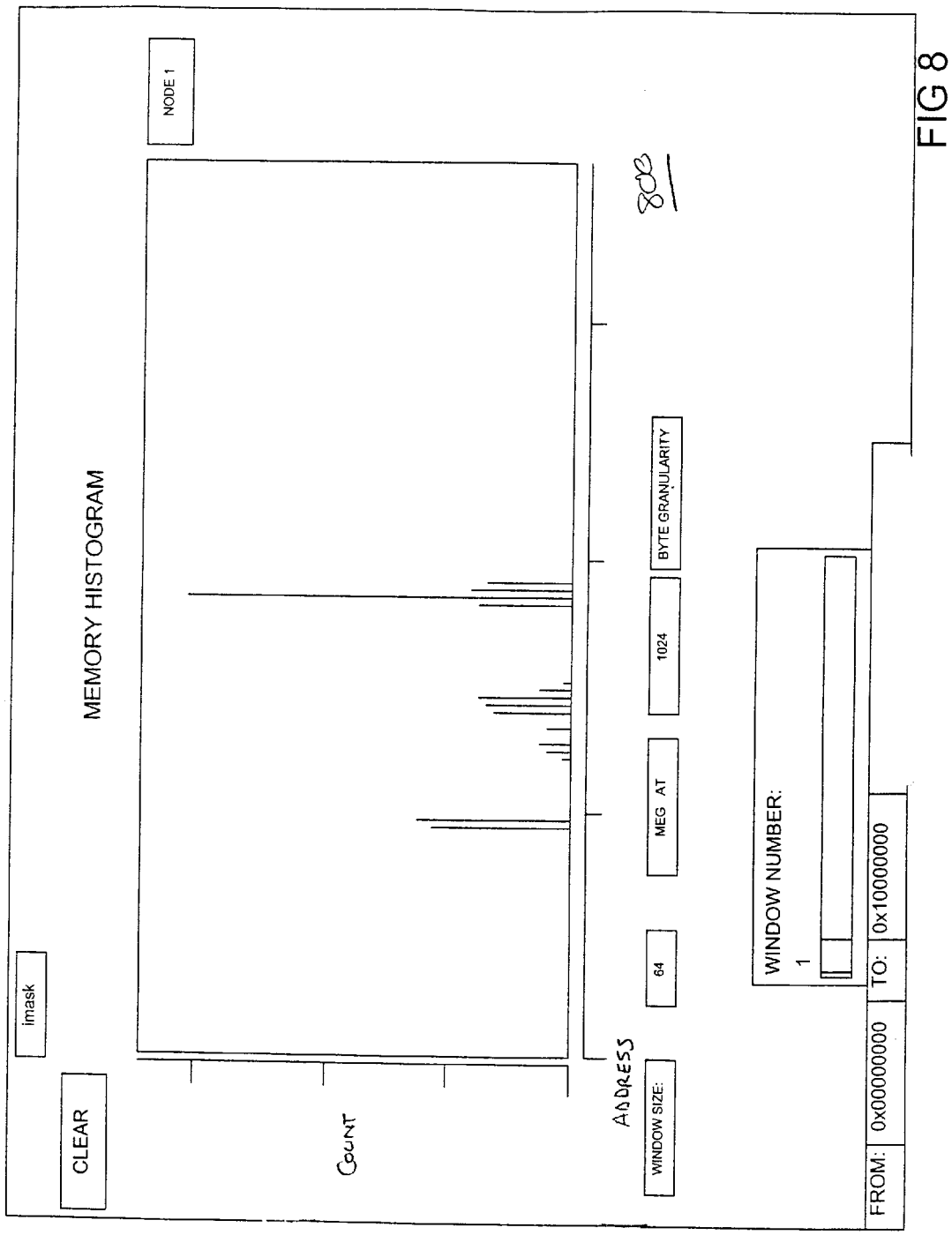
FIG. 8 illustrates an embodiment of a memory transaction histogram generated by the monitoring system of FIG. 5.

After selecting the appropriate window size and window number to obtain the desired physical memory window, the user may generate the memory activity histogram by clicking on a histogram button 706 histogram interface 700. In response to the selection of interface button 706, monitoring system 103 generates a histogram of memory activity in the defined physical memory range. A representative histogram 800 is indicated in FIG. 8 with the physical memory address on the horizontal axis and the number of memory accesses on the vertical axis. The memory activity that is displayed in histogram 800 is defined by the settings in interface 600. Thus, if a user selects incoming packets of all packet types of all nodes, histogram 800 will indicate all incoming packets within the selected memory range. In addition to displaying the memory activity, histogram 800 as depicted FIG. 8 displays the memory window sizes that were selected by the user with histogram interface 700. Histogram 800 indicates a count number with a vertical line for each "grain" of memory as defined by the window size and window number selections the user has made. In this manner, a user can define the type of memory activity of most interest and analyze very quickly whether the system exhibits any memory inefficiencies with respect to the selected memory activity. In a NUMA system, for example, local memory accesses are preferred to remote memory accesses. Thus, if a given histogram indicates a high concentration of memory activity in the physical address of a particular node 101, one can conclude that there is an undesirable level of inter-node activity corresponding to that node. In one embodiment, histogram 800 is maintained through the use of an interrupt mechanism as follows. The user initially defines an interrupt mask (IMASK) value that determines how frequently interrupts are generated. Each interrupt is associated with one of the memory grains or windows defined by the window size and window number settings. As memory activity is detected corresponding to a particular memory window, the associated counter is incremented. When a counter reaches the value defined by the IMASK setting, an interrupt is generated that indicates the memory window counter responsible for the interrupt. Based on this information, monitoring system 103 can update histogram 800 by lengthening the histogram line corresponding to the appropriate memory window by an amount representative of the IMASK value. If, for example, the IMASK value is 256, an interrupt is generated whenever one of the window counters reaches a value of 255. When the interrupt is detected, monitoring system 103 determines the monitoring window associated with the interrupt and increases the corresponding histogram line by an amount representative of 256 relative to the vertical scale of histogram 800. The selection of an appropriate IMASK value is guided by competing considerations. On the one hand, an IMASK value that is too low will generate relatively frequent interrupts that may affect the performance of the system being monitored (system 100). On the other hand, an IMASK value that is too high may result in too infrequent updating of histogram 800. A suitable IMASK selection allows relatively frequent updating of histogram 800 while having a minimal impact on the performance of system 100.

Thus, it will be apparent to those skilled in the art having the benefit of this disclosure that the present invention contemplates a facility for utilizing memory transaction monitoring hardware to generate a usable and informative display of memory activity in a complex data processing system such as a NUMA data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of monitoring memory transactions in a data processing system comprising:
    defining a set of memory transaction attributes with a monitoring system;
    detecting, on a data processing system connected to the monitoring system, memory transactions that match the defined set of memory transaction attributes; and
    displaying the number of detected memory transactions occurring during a specified duration in a graphical format.

2. The method of claim 1, wherein the data processing system comprises a NUMA system comprising a set of nodes, and wherein the detected transactions are transactions passing through a switch connecting the nodes of the NUMA system.

3. The method of claim 1, wherein the set of memory transaction attributes includes memory transaction type information.

4. The method of claim 1, wherein the data processing system comprises multiple nodes, and wherein the set of memory transaction attributes includes node information and transaction direction information.

5. The method of claim 1, wherein the data processing system comprises multiple nodes, and wherein the data processing system is operating under a first operating system and the monitoring system is operating under a second operating system.

6. The method of claim 1, wherein the defining of memory transaction attributes comprises entering a value in at least one node selection box and at least one packet type box of a graphical user interface, and selecting at least one direction transaction direction button.

7. The method of claim 1, wherein the defining of the set of memory transactions includes defining a memory window size and subdividing the memory window into a set of memory grains.

8. The method of claim 7, wherein displaying the number of detected memory transactions comprises, displaying the number of memory transactions corresponding to each memory grain in the memory window.

9. The method of claim 8, wherein displaying the number of memory transactions corresponding to each memory grain includes updating the display each time an interrupt, indicative of the number of detected memory transaction matching the memory grain attribute, is issued.

10. The method of claim 9, wherein the interrupt issues when the number of detected memory transactions matching equals a defined interrupt mask value.

11. A system for monitoring memory transactions on the NUMA processing system;
    a processor;
    a device driver configured to receive memory transaction information from a switch connecting the nodes of the NUMA system;
    user code configured to enable a user to define a set of memory transaction attributes and suitable for displaying the number of memory transactions matching the defined set of memory attributes during a specified duration.

12. The system of claim 11, wherein the device driver and user code are executing under a first operating system and the NUMA system is operating under a second operating system.

13. The system of claim 11, wherein the set of memory transaction attributes includes memory transaction type information, memory transaction direction information, and memory transaction node information.

14. The system of claim 11, wherein the set of memory transaction attributes includes memory address information.

15. A computer program product, comprising a set of instructions executable by a processor of a monitoring system for monitoring memory transactions in a NUMA system, the set of instructions comprising:
    graphical user interface means for defining a set of memory transaction attributes with a monitoring system;
    means for detecting, on the data processing system, memory transactions passing through a switch connecting the nodes of the NUMA system, that match the defined set of memory transaction attributes; and
    means for displaying the number of detected memory transactions occurring during a specified duration in a graphical format.

16. The computer program product of claim 15, wherein the set of memory transaction attributes includes memory transaction type information.

17. The computer program product of claim 15, wherein the set of memory transaction attributes includes node information and transaction direction information.

18. The computer program product of claim 15, wherein the data processing system is operating under a first operating system and the monitoring system is operating under a second operating system.

19. The computer program product of claim 15, wherein the graphical user interface means for defining the memory transaction attributes comprises means for entering values in at least one node selection box and at least one packet type box, and selecting at least one direction transaction direction button.

20. The computer program product of claim 15, wherein the means for defining of the set of memory transactions includes means for defining a memory window size and subdividing the memory window into a set of memory grains.

21. The computer program product of claim 20, wherein the means for displaying number of detected memory transactions comprises, displaying the number of memory transactions corresponding to each memory grain in the memory window.

* * * * *